April 11, 1939. R. S. HIRSCH 2,154,332
OBSTETRICAL RECEPTOR PAD
Filed Sept. 1, 1936 2 Sheets-Sheet 1

Inventor
Raymond S Hirsch

By Clarence A. O'Brien
Hyman Berman
Attorneys

April 11, 1939.   R. S. HIRSCH   2,154,332
OBSTETRICAL RECEPTOR PAD
Filed Sept. 1, 1936   2 Sheets-Sheet 2
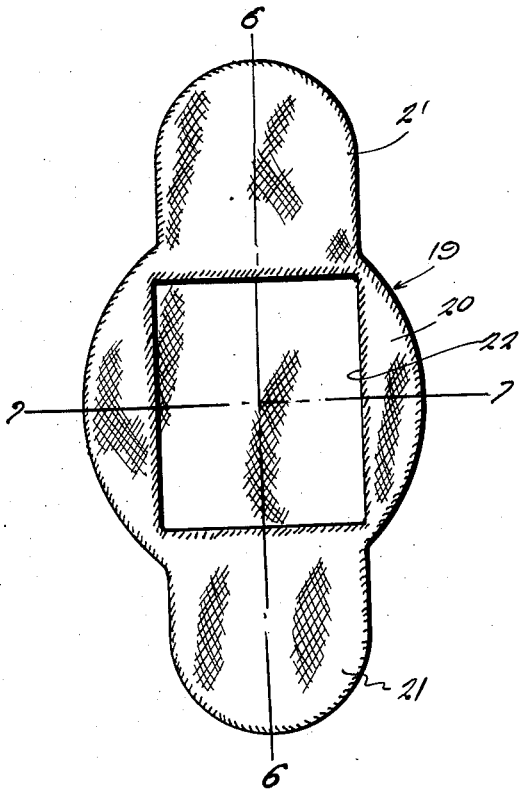
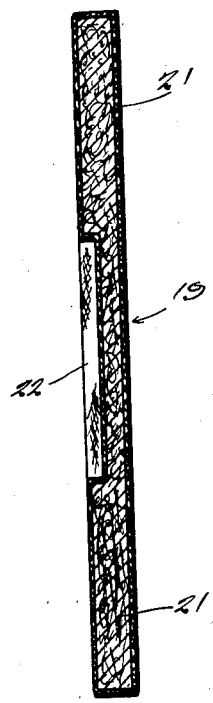
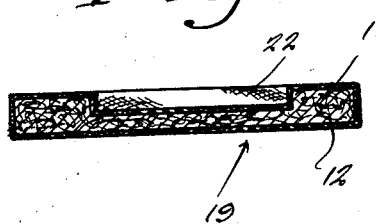
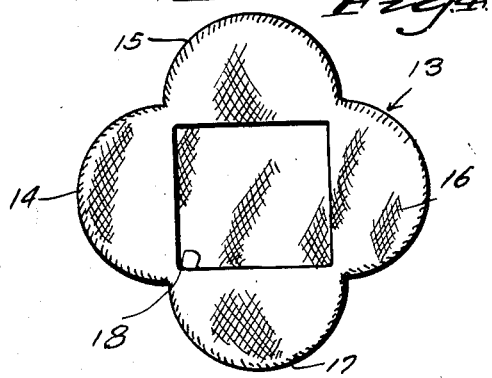
Inventor
Raymond S. Hirsch
By Clarence A. O'Brien
Hyman Berman
Attorneys Patented Apr. 11, 1939

2,154,332

UNITED STATES PATENT OFFICE 2,154,332

OBSTETRICAL RECEPTOR PAD

Raymond S. Hirsch, Viroqua, Wis., assignor of one-half to I. J. Wilson, Portage, Wis.

Application September 1, 1936, Serial No. 98,937

1 Claim. (Cl. 128—292)

This invention appertains to new and useful improvements in sanitary utility pads for patients, which has as its principal object to provide a means of retaining in its absorbent filler such excretions as may involuntarily be passed by a patient.

Another important object of the invention is to provide a pad which in obstetrical practice is especially effective in providing a sterile field and to absorb amniotic fluid, etc., incidental to child birth.

Another important object of the invention is to provide a pad adapted for the above purposes which after use can be discarded, the same being constructed of inexpensive material.

These and various other important objects and advantages of the invention will become apparent to the reader of the following specification.

In the drawings:

Fig. 4 is a top plan view of a modified form of the invention.

Fig. 5 is a top plan view of a third form of the invention.

Fig. 6 is a section on line 6—6 of Fig. 5.

Fig. 7 is a section on line 7—7 of Fig. 5.

Figures 1, 2, 3:
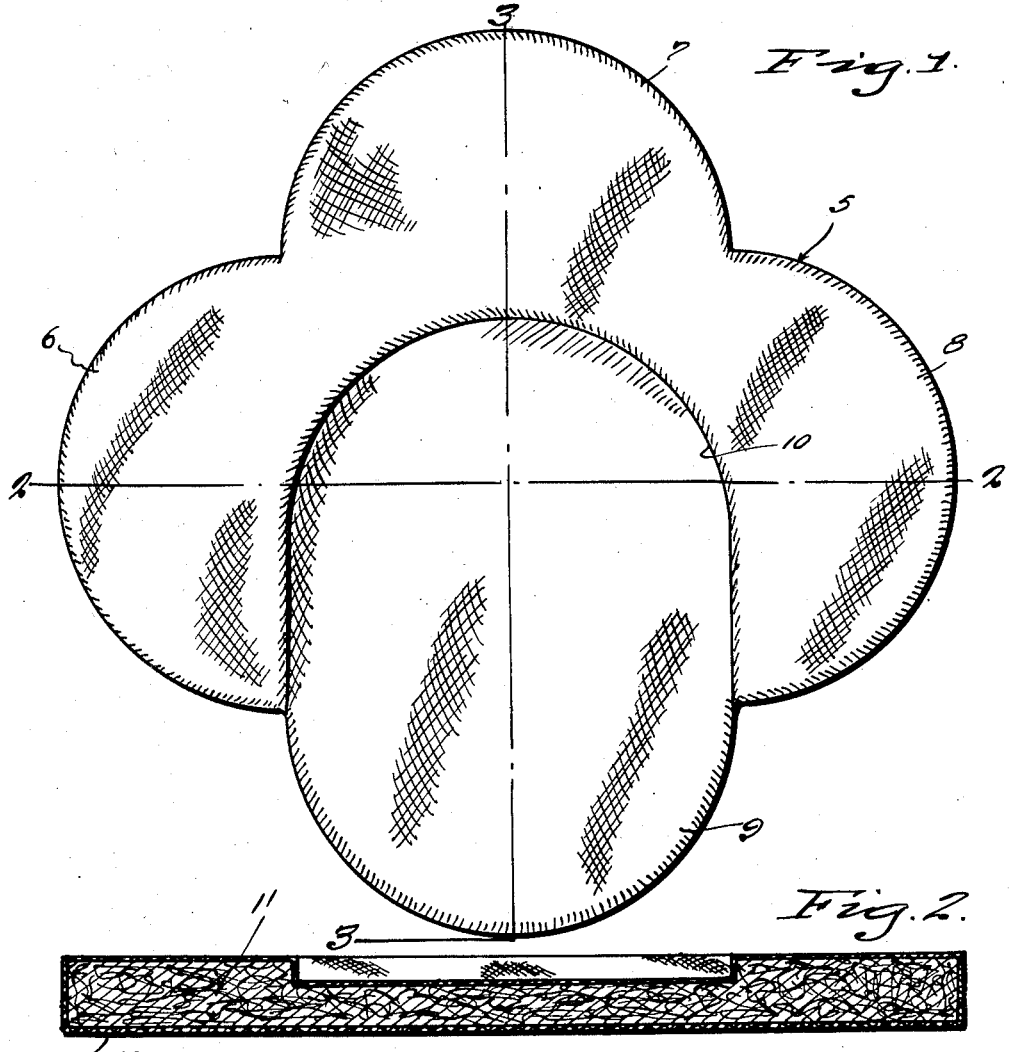
Figure 1 represents a top plan view of one form of the invention.
Fig. 2 is a cross section on line 2—2 of Fig. 1.
Fig. 3 is a longitudinal section on line 3—3 of Fig. 1.

Referring to the drawings wherein like numerals designate like parts, it can be seen that the form of the invention generally referred to by numeral 5 is of substantially shamrock shape, the same consisting of the petal portions 6, 7 and 8, and the relatively thick stem portion 9. The stem portion 9 extends into the formation of petals at about midway of its length and starts to decline into the petal construction proper so as to form a pocket 10 having a sloping bottom.

As can be seen in Fig. 2 and Fig. 3, the pad is made up of the absorbent filler 11 and the gauze jacket 12.

The form of the invention shown in Fig. 4 and generally referred to by numeral 13 is substantially of four-leaf clover shape, the same having the petal portions 14, 15, 16 and 17. Centrally located in its petal construction is the depression 18, the depression being shown square.

The form of the invention shown in Fig. 5 and generally referred to by numeral 19 consists of the substantially circular shaped body portion 20 having a pair of flaps 21—21 radially disposed therefrom in a diametrical direction. Located centrally in the circular body 20 is the square shaped depression 22. Obviously these pockets or depressions 10, 18 and 22 are to initially catch any fluid to be absorbed so that it will not run off of the pad and give the filler 11 time to absorb the same.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

An obstetrical pad comprising a substantially oblong shaped central absorbent portion to be arranged under a crotch of a person while in a reclining position and having rounded ends and substantially straight parallel sides and provided with a recess spaced from the ends and sides thereof to catch fluids from the crotch of the person and having the bottom wall sloping towards one end of the central portion to increase the depth of the recess at said end of the central portion to retain the fluids while being absorbed by said central portion, and a marginal absorbent portion forming an integral part of the central portion and arranged along a portion of the sides and one end of said central portion and providing thereto a pair of flaps arranged opposite to each other and adapted to underlie the buttocks of the person, and an end flap to underlie a portion of the back of the person.

RAYMOND S. HIRSCH.